July 7, 1931.  C. A. SAWTELLE  1,813,319
FLUID BRAKE MECHANISM
Filed July 18, 1927  3 Sheets-Sheet 3

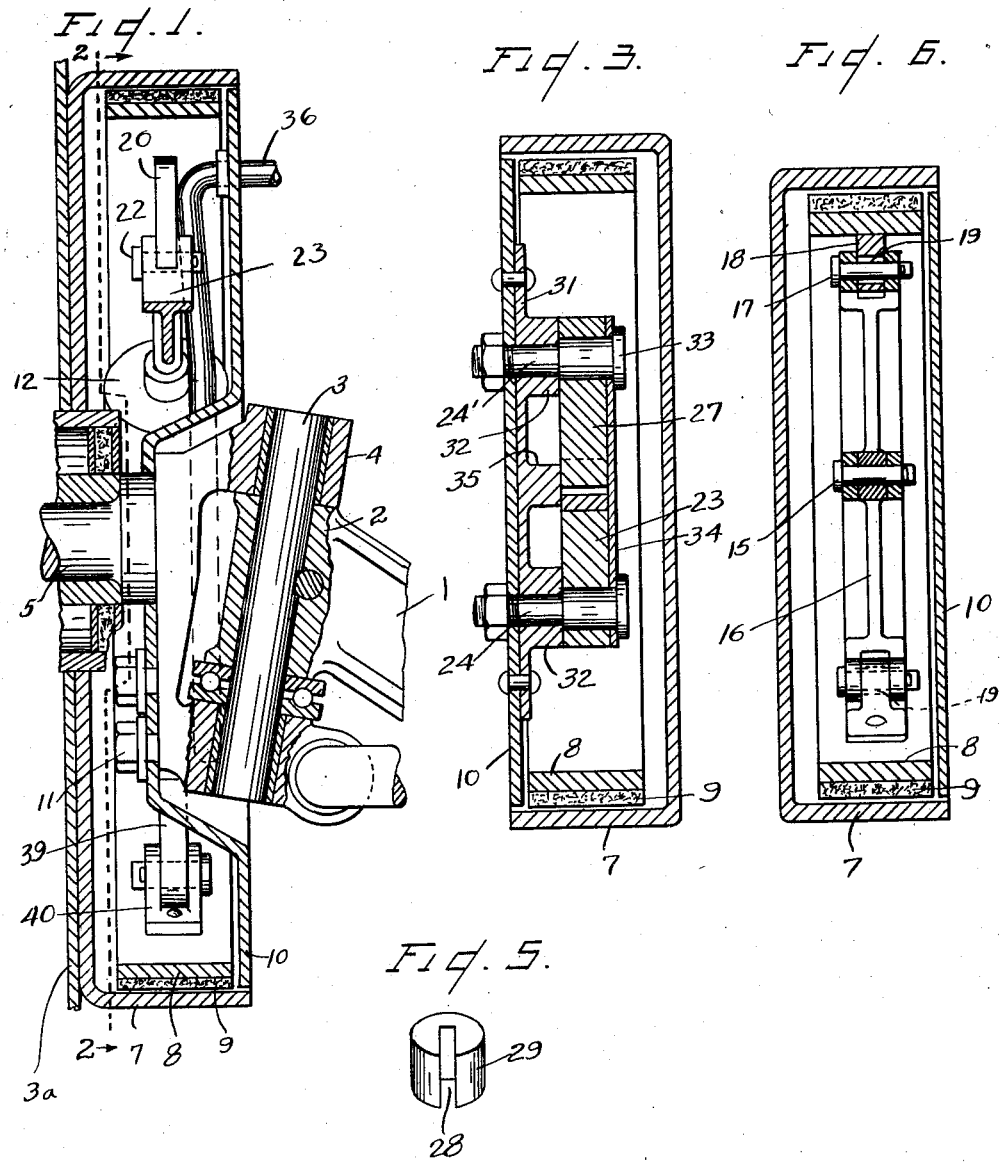

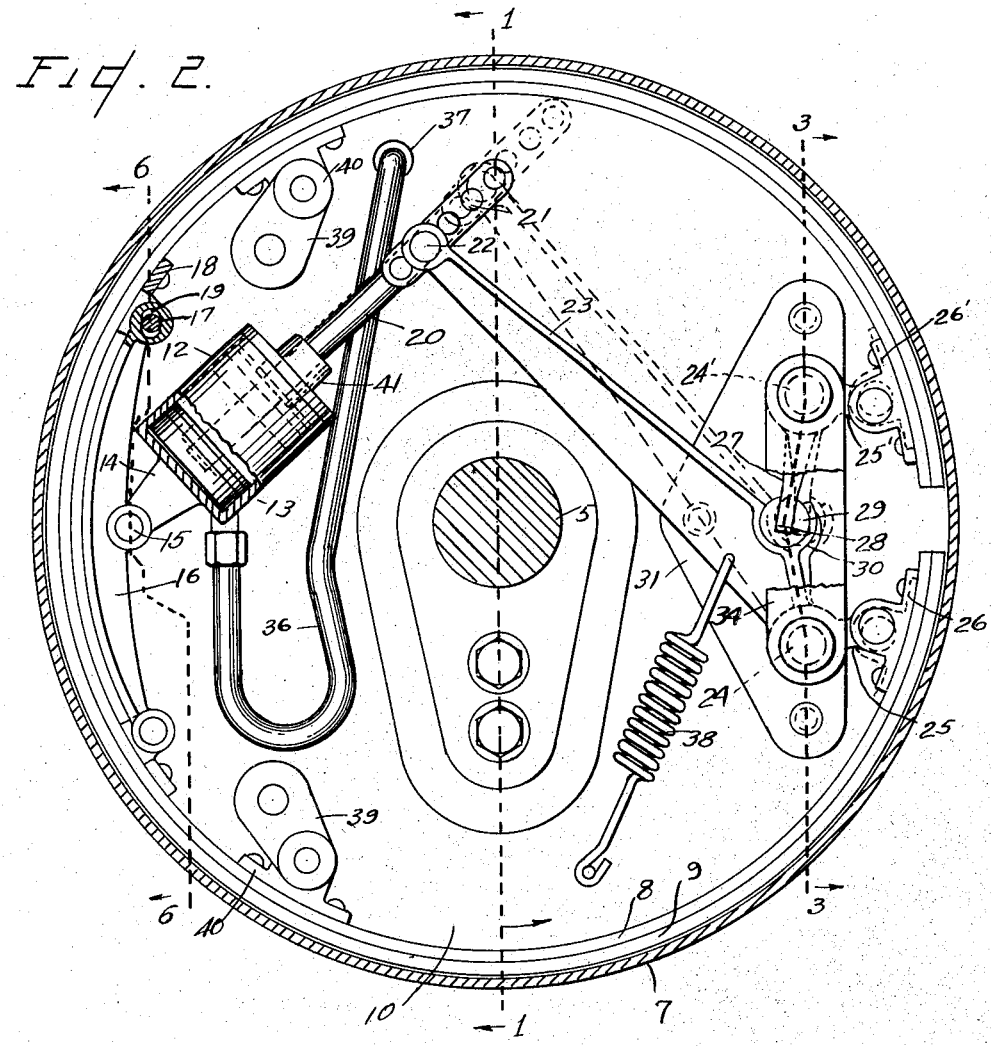

INVENTOR
Charles A. Sawtelle
BY
Swan, Turpo, + Murray
ATTORNEYS

Patented July 7, 1931

1,813,319

UNITED STATES PATENT OFFICE

CHARLES A. SAWTELLE, OF DETROIT, MICHIGAN, ASSIGNOR OF ONE-HALF TO ARMIN A. DARMSTAETTER, OF DETROIT, MICHIGAN

FLUID BRAKE MECHANISM

Application filed July 18, 1927. Serial No. 206,446.

This invention relates to vehicle brake mechanisms and particularly to fluid pressure operated brake mechanisms.

An object of the invention is to dispose within a brake drum a fluid-pressure motor for engaging a brake band or the like interiorly with said drum and to so mount said motor as to fully transform applied fluid pressure into a braking effort exerted upon said band.

Another object is to arrange a brake-applying fluid motor within a brake drum and to establish a unitary relation between said motor and a brake band or equivalent element actuable by said motor so as to facilitate installation and removal of the unit formed by said drum and band.

A further object is to avoid any servo effect in engaging a brake drum by a brake band or the like, particularly when the direction of rotation of said drum is normal.

Still another object is to provide an improved means for adjusting a brake mechanism to compensate for wear of the brake band or equivalent element.

It is an object of the invention also to provide a brake-applying fluid motor comprising a piston and cylinder and to derive a braking effort from the fluid pressure acting both upon said piston and upon the cylinder.

These and various other objects the invention attains by the construction hereinafter described and illustrated in the accompanying drawings, wherein:—

Figure 1 is a view in vertical sectional elevation on line 1—1 of Figure 2 of the herein-described brake mechanism applied to one of the front wheels of a vehicle, showing only those portions of such wheel and of the corresponding axle as are directly associated with said mechanism.

Figure 2 is a sectional view of the same taken upon the line 2—2 of Figure 1 primarily showing a fluid pressure responsive motor within the brake drum and means for actuating a brake band from said motor.

Figure 3 is a sectional view taken on line 3—3 of Figure 2 disclosing the mounting of a pair of levers which are connected to the brake band extremities.

Figure 5 is a detail perspective view of a slotted pin forming an element of the brake mechanism.

Figure 6 is a section upon the line 6—6 of Figure 2 showing a provision for mounting one end of a fluid motor upon the brake band.

Figures 4, 4A:
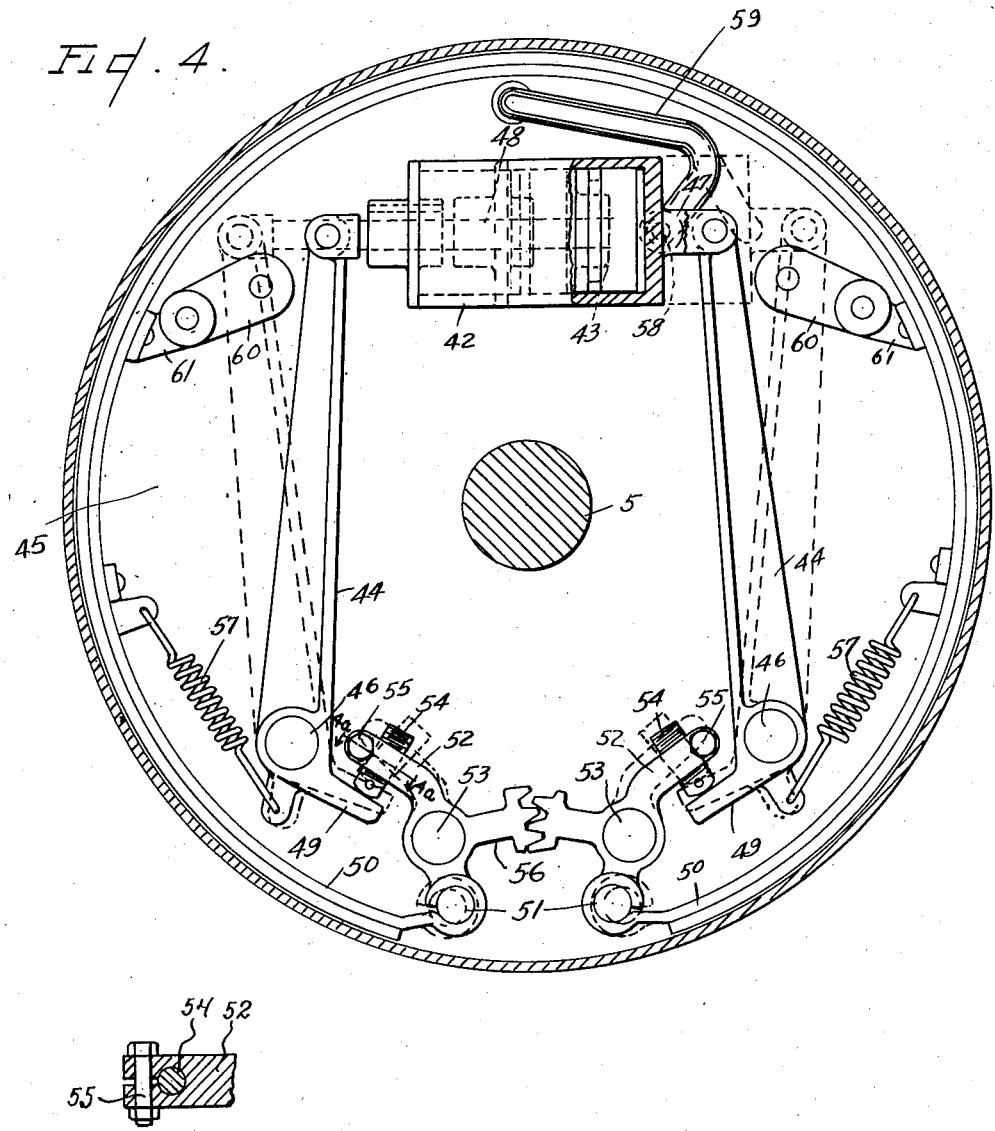
Figure 4 is a view similar to Figure 2 but disclosing an alternative form of the invention.
Figure 4a is a section upon line 4a—4a of Figure 4.

In these views the reference character 1 designates the front axle of a motor vehicle, which axle terminally is formed with a bearing 2 in which is secured a pivot pin 3 for a wheel 3a mounted upon said end of the axle. Thus, a pair of bearings 4 journaled upon said pin respectively above and below the bearing 2 integrally carry a spindle 5 upon which is journalled in the usual manner the wheel 3a. To said wheel is secured, as is common practice, a brake drum 7 interiorly engageable by a brake band 8 provided with the usual replaceable lining 9 for taking wear. As is common practice, the drum 7 is closed at its side adjacent to the axle by a plate 10 which forms the carrier for a mechanism actuating the band 8, said plate being secured by bolts 11 or the like to the unit formed by the bearing 4 and spindle 5.

For applying the brake, there is provided within the drum 7 a fluid motor comprising a cylinder 12 and a piston 13 reciprocating in said cylinder. The latter has one extremity formed with an axially projecting supporting bracket 14 which is pivoted, as indicated at 15, upon a circumferentially elongated plate 16 through which pressure is applied from said cylinder to the band 8, the pivot 15 being preferably substantially midway between the ends of said plate. The plate 16 extends through a sufficient arc to insure distribution of the applied pressure applied over a considerable area of the band. The ends of said plate are pinned as indicated at 17 to brackets 18 interiorly carried by the band 8 and one of said ends is slotted circumferentially as indicated at 19 to permit such slight circumferential play between the plate and bracket as may be required by wear of the brake band lining. That is to say as the brake band is worn away the arc through the centers of the pins 17 increases somewhat in length owing to the resulting increased outward travel of said band and this necessitates a certain play circumferentially between the plate 16 and one of its supporting brackets.

Through the end of the cylinder 12 opposite to that formed with the bracket 14 there projects slidably a piston rod 20, the free end portion of which is formed with a plurality of openings 21 for selective engagement by a pin 22 pivotally connecting said rod to a lever 23. Said lever forms the long arm of a bell crank, pivoted at 24 upon the carrier plate 10 and having a much shorter arm 25 projecting at an angle to the lever 23 and pivotally engaging a bracket 26 fixed upon one end of the brake band 8. Upon the other end of said band is secured a similar bracket 26', pivotally engaged by a lever arm 25' substantially duplicating the arm 25, and pivoted at 24' similarly to the arm 25. Forming a bell crank with the arm 25' is an arm 27 which is terminally slidable in a radial slot 28 formed in a cylindrical pin 29 journaled in a bearing 30 formed in the arm 23, said bearing having a sufficient opening in its wall to accommodate the arm 27. Thus, both ends of the brake band 8 are adapted to be correspondingly actuated through a rocking actuation of the lever 23.

For properly positioning the two bell crank members and the pivot element 29 there is riveted or otherwise secured to the carrier plate 10 a supplementary plate 31 formed with bearings 32 in which are secured the pins 24 and 24' which mounted said members. The outer ends of said pins are headed as indicated at 33 and between said heads and said bell cranks a sheet metal strip 34 is jointly carried by said pins 24 and 24'. A boss 35 formed upon the central portion of the plate 31 co-acts with the strip 34 to restrain the pivot member 29 from endwise shifting.

Air, or some other suitable actuating fluid, is adapted to be admitted to the cylinder 12 at the end thereof carrying the bracket 14 through a suitable duct 36 formed of copper or other material sufficiently flexible to afford the cylinder a slight longitudinal play. Said duct passes through a suitable opening 37 in the carrier plate and is connected to any suitable source of fluid pressure (not shown). Air is adapted to freely enter and leave the end of the cylinder through which the rod 20 projects by way of a vent 41 in said end.
A coiled spring 38 anchored at one end to the carrier plate 10 and secured at its other end to the pivotal end portion of the arm 23 urges said arm normally to the position illustrated in full lines in Figure 2 in which the piston 13 is adjacent to the ported end of the cylinder 12 and in which the band 8 is withdrawn from the drum 7.

For guiding the brake band in its expansion and contraction a pair of links 39 are pivoted at their inner ends, the carrier plate engaging brackets 40 upon said band, said links being arranged in a suitable angular relation to the band to guide the latter in its expansion or contraction.

In the operation of the described device when fluid under pressure is admitted through the tube 36 to the outer end of the cylinder 12 the piston 13 is actuated toward the inner end of said cylinder, as indicated in dash lines in Figure 2, the rod 20 then assuming the position also indicated in dash lines in said figure. The resulting positions of the bell crank 23, 25, and 27, 25' are also indicated in dash lines in said figure. The described connection between the bell cranks tends to eliminate any servo action since any tendency toward self-energized movement of the band in either direction must necessarily tend to swing the two bell-cranks in a direction overcoming such tendency. A considerable leverage is afforded by employing a power arm 23 much longer than the work arms 25 and 25'. When fluid pressure in the cylinder 12 is relieved, the action of the spring 38 upon the arm 23 serves to immediately restore the positions of the parts shown in full lines in Figure 2, thus retracting the brake band. The direction of rotation of the brake drum for forward travel of the corresponding vehicle wheel is indicated by the arrow in Figure 2. It is to be noted that the inclination of the cylinder 12 to the brake band is such as to assist in eliminating any possible servo effect when the drum is rotating in the specified direction. Servo, or self-energizing action is considered undesirable since it detracts from the complete exercise of control of the braking action by the operator, and such an effect is further superfluous in a fluid pressure system which permits of an amply adequate braking pressure without servo action.

The series of openings 21 in the piston rod 20 provide for adjustment of the connection between the rod 20 and the arm 23 to compensate for wear of the brake band lining. Thus, when occasion requires, the point of connection of the arm 23 to said rod may be shifted toward the free end of said rod to decrease the normal clearance between the brake band and drum and thus compensate for wear of the lining.

In that modification of the invention which is illustrated in Figure 4, a fluid motor comprising a cylinder 42 and a piston 43 reciprocating therein, is mounted upon and between the upper extremities of a pair of lever members 44 pivoted upon a carrier plate 45 as indicated at 46. This mounting of said motor is established by pivotally engaging a bracket 47 formed upon one head of said cylinder with one of such arms and by pivotally connecting to the other of said arms the outer end of a piston rod 48 sliding through the other head of said cylinder. The levers 44, together with short arms 49, projecting divergently toward each other from the pivots 46 form bell crank members. To the adjacent ends of the brake band 50 are pivoted, as indicated at 51, a pair of levers 52 which are pivoted upon the carrier plate as indicated at 53. The upper ends of the levers 52 project adjacent to the inner faces of the arms 49 and carry thrust-pins 54 threaded in said arms 52 to afford adjustment therein to compensate for wear of the brake lining. Said inner ends of the arms 52 are split to embrace the pins 54 and are engaged by clamping bolts 55 whereby any adjustment of the pins 54 in said arms may be maintained.

Adjacent to pivots 53 the levers 52 are integrally formed with a pair of gear segments 56 projecting toward each other and intermeshed, thus serving to insure a uniform actuation of both ends of the brake band.

A pair of coiled springs 57 are extended from the pivoted ends of the arms 44 to the brake bands 50 to maintain said brake bands normally retracted. In dash lines in Figure 4 there are illustrated the positions assumed by various parts when the brakes are applied. Fluid under pressure is adapted to be admitted to the cylinder 42 through a suitable port 58 from which a flexible tubular connection 59 extends through the carrier plate 45 to any suitable source of fluid pressure.

60 designates a pair of links mounted at their inner ends upon the carrier plate 45 and engageable at their outer ends with brackets 61 upon the brake band to guide the latter in its contracting and expanding travel.

It is to be noted that in the first described form of the invention the brake applying fluid motor 12, 13 is mounted jointly upon the brake band and upon the arm 23 which is permanently connected to the brake band. Thus there is established a unit assembly relation between said fluid motor and the brake band and the mechanism through which the band is actuable by said motor and a similar unitary relation is established in the described alternative by mounting the fluid motor 42, 43 directly upon the two levers 44 through which the respective ends of the brake band are actuated.

It is also a feature of both constructions that both the fluid pressure applied to the piston and the reaction of such pressure upon the cylinder are utilized in applying the brake.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. A brake mechanism comprising a brake drum, a braking element interiorly engageable with said drum, a fluid pressure motor within the drum, a pressure distributing plate carried by said braking element and pivotally supporting said motor, and actuating mechanism connecting said motor and braking element at a point opposed substantially diametrically to said distributing plate.

2. A brake mechanism comprising a drum, a brake band interiorly engageable with said drum and having adjoining ends, a fluid motor for actuating said band pivotally connected to the band in a substantially opposed relation to said ends, an actuating connection from said motor to both of said ends, and means engaging said band at opposite sides of said pivotal connection to the motor for guiding the band into and out of engagement with the drum.

3. A brake mechanism comprising a brake drum, a brake band interiorly engageable with said drum, a fluid pressure motor within the drum, a pair of bell crank levers pivoted respectively to the extremities of the band, means connecting said levers for actuation in unison, an actuating connection from said motor to said levers, and a further actuating connection from said motor to a point upon the band opposed substantially diametrically to said levers.

4. A brake mechanism comprising a drum, a brake band interiorly engageable with said drum and having adjoining ends, a fluid motor within the drum, a pair of pivotal elements establishing an actuating connection from said motor to the ends of said band, pivotal supports for said elements fixed to resist the rotational stress imposed upon the brake band by the drum when the two are engaged, and a further actuating connection from said motor to said band at a point upon the latter substantially diametrically opposed to said levers.

5. A brake mechanism comprising a brake drum, a brake element interiorly engageable with said drum, a fluid pressure motor within the drum pivotally connected to said brake element, a lever actuable by said motor, and further transmitting the effort of said motor to said brake element, and a pivot member for said lever fixed with respect to said brake element, whereby said lever is adapted to restrain the brake element from rotation.

In testimony whereof I hereunto set my hand.

CHARLES A. SAWTELLE.